United States Patent [19]

Bird

[11] 4,263,939

[45] Apr. 28, 1981

[54] SINGLE STAGE REGULATOR WITH SURGE REDUCING VALVE

[75] Inventor: Robert E. Bird, Eureka, Mo.

[73] Assignee: Modern Engineering Company, Inc., St. Louis, Mo.

[21] Appl. No.: 33,760

[22] Filed: Apr. 27, 1979

[51] Int. Cl.³ .............................................. F16K 47/08
[52] U.S. Cl. ...................................... 137/613; 251/118
[58] Field of Search ............... 251/118; 137/613, 557, 137/505; 128/142.2, 203; 138/44

[56] References Cited

U.S. PATENT DOCUMENTS

| | | | |
|---|---|---|---|
| 791,889 | 6/1905 | Ellis et al. | 251/118 |
| 1,319,782 | 10/1919 | Maul | 137/613 |
| 1,334,079 | 3/1920 | Callicott | 251/118 |
| 1,622,843 | 3/1927 | Price et al. | 138/42 |
| 1,883,690 | 10/1932 | Gilgenberg | 251/118 |
| 2,091,051 | 8/1937 | Mesinger | 251/118 |
| 2,323,839 | 7/1943 | Nixon | 251/118 X |
| 2,676,470 | 4/1954 | Streitz | 138/44 |
| 2,893,435 | 7/1959 | Eichenberg | 138/44 |
| 2,908,158 | 10/1959 | Jacobson | 251/118 |
| 3,025,875 | 3/1962 | Stover | 251/118 |
| 3,043,302 | 7/1962 | Spears et al. | 128/203 |
| 3,693,652 | 9/1972 | Iung | 137/557 |
| 3,885,590 | 5/1975 | Ford et al. | 137/613 |
| 3,976,067 | 8/1976 | Amlong | 137/505 X |

FOREIGN PATENT DOCUMENTS 551909 7/1932 Fed. Rep. of Germany ........... 137/557

Primary Examiner—Alan Cohan
Assistant Examiner—A. Michael Chambers
Attorney, Agent, or Firm—Paul M. Denk

[57] ABSTRACT

In a single stage regulator as used in conjunction with a high pressure vessel, a surge reducing valve is positioned within the outlet from the regulator and just at its low pressure side of the regulator in order to reduce any surge or jump in the gas flow during sustained gas consumption or when it is shut off.

3 Claims, 5 Drawing Figures

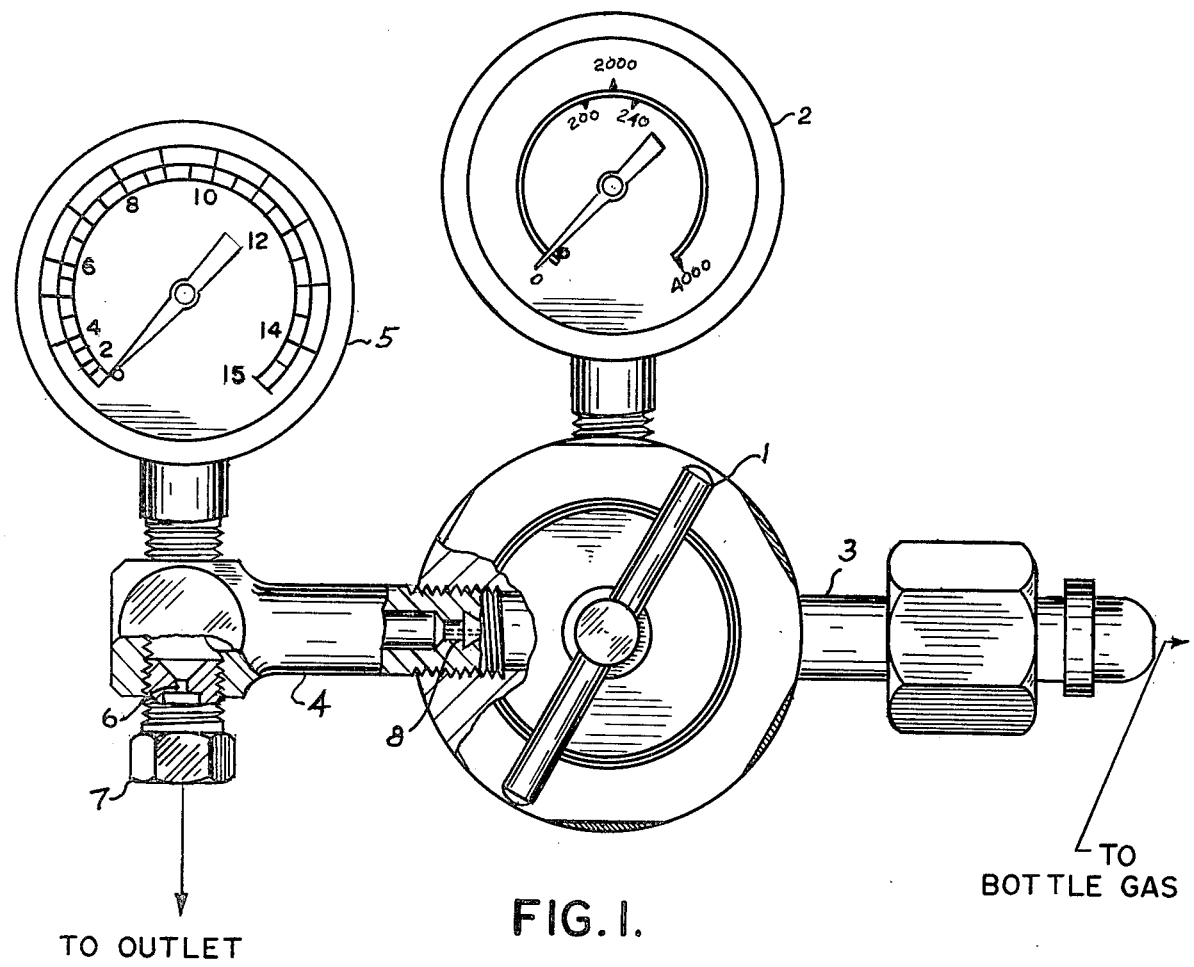
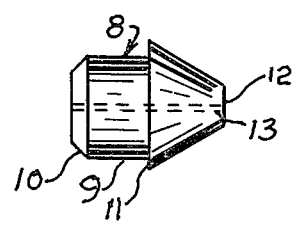
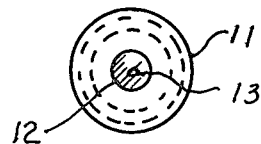
FIG. 1.
TO OUTLET
TO BOTTLE GAS
FIG. 2.
FIG. 3.

SINGLE STAGE REGULATOR WITH SURGE REDUCING VALVE

BACKGROUND OF THE INVENTION

This invention relates generally to gas regulators, and more particularly pertains to a surge reducing valve used in conjunction therewith.

The construction and usage of single stage regulators in conjunction with high pressure gas, as contained within a vessel, is well known and understood within the art. For example, such regulators normally include a housing that incorporates an intake side, and which usually connects with the high pressure vessel, and an outlet conduit that conveys the now reduced and low pressure gas to its point of usage, whether it be to an acetylene welding torch, or any oxygen delivery system such as used for patient treatment within a hospital. And, such type regulators further usually incorporate a handle or adjusting screw that cooperates with a spring that applies pressure upon a diaphragm and cooperating disc for effecting that rather precise reduction in the pressure of the gas being delivered from the high pressure vessel to its point in consumption. Normally, the gas pressure within such a vessel may be within a range of 2,000 to 2,500, or more, psi, whereas, gas pressure at its point of usage may preferably and desirably be within the range and vicinity of 2 to 4 psi, and normally less than 10 psi. Precision in the regulation of the pressure of this delivered gas is rather critical, since, for example, in the torch technology it is desirable that the welder or steel worker be able to adjust the torch flame to that required length as desired and needed for the particular job being performed. Furthermore, and of more criticality, the delivery of, for example, oxygen to the patient must be at a rather precise level, and the technician must be assured that once the pressure regulator is adjusted to effect delivery of this gas at a defined critical level, that such will be maintained. Any variation in the quantity or volume of gas being delivered may have injurious effects on the patient being treated, and therefore, precise control in this specific usage is significantly critical.

But, even in view of the foregoing, and particularly during gas flow control through the use of single stage regulation, the industry has constantly been plagued by what is generally defined in the art as a jump in the gas flow, generally comprising either a momentary or gradual rise as the gas from the vessel is being consumed. Furthermore, such jump can more dramatically occur when the gas flow from the vessel is curtailed, as through a shutoff of its regulator, and when this occurs a surge in the gas pressure is significantly increased until it finally drops after a few seconds of terminal flow to its required zero level. An analysis of this predicament will be subsequently reviewed in detail.

Various prior art structures for regulating pressurized gas flow have been devised, generally for the purpose of providing a reduction in the gas flow from that high pressure maintained in the vessel, particularly when a new bottle of gas is tapped for usage. For example, the two U.S. Pat. to Amlong, No. 4,008,716 and No. 3,976,067, probably disclose the more current type of gas dispensing assemblies now in use, and from these two particular patents one can see the concept of utilizing a pair of valves, but in this particular instance, in demand valves, being used at the outlet part of the gas storage vessel and to either side of its pressure gauge for attaining a particular and desired result. The valve shown in these two designs, as previously explained, are of the demand valve type, and function mainly to regulate the flow of oxygen during the specific inhalation cycle of the patient being tested or treated. Their specifications do not describe the use of the valves for the specific purpose of finely regulating or eliminating the surge of any gas dispensed from the vessel, and particularly at its outlet assembly, but rather, are simply to provide the means for retaining particular dispension of oxygen only when a demand is made, as specifically during the inhalation breath cycle of the patient.

The U.S. Pat. to McClelland, No. 1,939,509, recognizes that a problem may be inherent in the usage of pressure indicating gauges for detecting flow rates, and that vibrations or pulsations of the indicating pointer of such a gauge may be an existing problem. Thus, to solve that problem, this prior art disclosure shows the usage of a baffle having a fine bore therethrough, as the means for controlling exposure of the pressurized material to the gauge indicating means. This has a minor relationship to the invention under consideration, in that it does disclose the usage of some form of a small bore baffle for regulating flow, but in this instance, the flow is directed only towards the indicator, and not within the main line transfer of any pressurized fluid, such as the gas, to an outlet, and to its location of usage, and more specifically for preventing gas surge during such operation.

The patent to Koppleman, U.S. Pat. No. 2,855,926, discloses an oxygen dispensing machine wherein a couple of valves are provided for regulating gas flow to the mask. In addition, a demand regulator is also provided for authorizing the dispensing of gas only upon demand, as previously explained, as when the user inhales. But, there is nothing shown within this disclosure relating to any dampening of any gas surge as when the main valve is shut off, or while the gas flow is maintained desirably at a regulated amount over a sustained period of time.

The U.S. Pat. to Flint, No. 4,006,742, simply discloses another form of control valve for use in the administration of gases such as oxygen, or the like. The pressure relief in this particular control functions by way of a disc valve, which just allows for the exhausting of any high pressure when release is needed. But, there is nothing in this disclosure relating to the dampening of any surge during gas flow or shut off.

Finally, the U.S. Pat. to Price, No. 1,622,843, discloses the use of a stabilizer for preventing rapid fluctuations in the pressure of a gas within the main air line, and which may have an effect upon gas flow, with this accomplishment being achieved from this prior art design for use as a restricting means, such as by means of a small opening nozzle, which functions as an inverted Venturi for dampening the pressurized liquid pulsation within the main line. Apparently this type of a restriction within the outlet line of a regulator still encounters the surging problem when the main supply of gas is shut off, whereas, with the current invention, this problem has been significantly eliminated through the usage of a supplemental surge reducing valve which constricts passage of the pressurized gas immediately as it leaves the regulator and to a point of usage.

In view of the foregoing, it is the principal object of this invention to provide a particular style of surge reducing valve in a regulator as the high pressure gas is reduced for usage from a single stage regulator in order that a constant flow of gas at a particular pressure is maintained throughout its consumption.

A further object of this invention is to provide means for furnishing a precisely regulated flow of gas from a high pressure vessel.

Yet another object of this invention is the provision of means for providing a constriction to the flow of pressurized gas so as to attain its regulation to a desired pressure, and to within a range of a constant value.

Still another object of this invention is the structure of the surge reducing valve for use in conjunction with the single stage regulator for precisely controlling the flow of gas under pressure.

Another object of this invention is the furnishing of means to minimize the risk of damage or harm to one working with highly pressurized and flammable gases.

Another object of this invention is to prevent an immediate surge in gas flow after a regulator has been shut off.

Still a related object of this invention is to provide means for preventing a jump in the flow of gas as the pressure of the gas within a vessel is gradually depleted.

These and other objects will become more apparent to those silled in the art upon reviewing the summary of this invention and upon undertaking a study of its preferred embodiment in view of the drawings.

SUMMARY OF THE INVENTION

This invention contemplates the locating of particularly styled surge reducing valve within the flow path of pressurized gas passing through the single stage regulator and from a pressurized vessel of gas. Essentially, the valve means comprises a cylindrical member that has an aperture or channel therethrough, being of a relatively small diameter dimension, and which acts as a constriction against the onrush of the pressurized gas to flow from its vessel and into and through the regulator wherein its pressure may be dropped from the 2,000 psi range down to a significantly reduced value of approximately less than 10 psi, which is the pressure of the gas as normally used in conjunction with other equipment as previously described. This surge reducing valve fits within the outlet line of the regulator, or at least in some conduit that leads between the regulator and the point of its usage, with said valve having a shoulder formed therein so as to provide for its snug seating within an inset of the outlet conduit. Furthermore, said valve may incorporate a taper from its formed shoulder to its inlet side so as to aid in the installation of the valve within the particular conduit leading from the high pressure vessel. In addition, the opposite end of the surge reducing valve means has a slight chamfer provided thereon in order to furnish clearance for insuring the snug insertion and fitting of the valve when installed.

An example of the attributes to be obtained from usage of this invention may be observed from the charts disclosed in FIGS. 4 and 5 of the drawings. For example, in FIG. 4, this particular graph discloses the functioning of a single stage regulator in conjunction with a pressurized vessel of gas, and shows just how the low pressure flow meter of the regulator when adjusted to provide for a discharge of 4 psi gas from the gas vessel, during the continuing discharge of the gas from the same, over a prolonged period of time, gradually increases in pressure up to approximately 9.5 psi, without any further adjustment having been made to the regulator, before it drops off to a zero pressure as attained upon emptying of the said vessel. Thus, without the use of the surge reducing valve of this invention, the pressure significantly increases from the desired and usable 4 psi and up to and approximating 10 psi just through a normal discharge of the said gases through the adjusted and single valve set regulator. The detriments to be obtained from such a functioning regulator can be readily determined where the gas being dispensed from the pressure vessel may be used in conjunction with an oxygen mask, as for example, when applied to a patient in a hospital or related facility, which under normal operating conditions through the usage of the current regulator technology, significantly increases in the gas discharge level and to a level that may be harmful to the patient. Whereas, the recommended dosage of the oxygen delivered to the mask may be at the 4 psi level, after a few hours of discharge, or perhaps over a night's application to the sleeping patient, the gas discharge may more than double that amount as can be readily determined from the chart line shown in FIG. 4.

On the other hand, and as can be determined from FIG. 5, wherein the medical regulator is provided with the surge reducing valve restriction in its outlet as applied through the teachings of this invention, once the regulator is set to dispense, as for example as shown at a 4 psi of pressurized oxygen, as the vessel discharges, and even when it approaches a zero capacity, the regulator, with the installed inventive valve, has prevented the gas discharge from rising above approximately 5 psi. Thus, level gas flow is approximately maintained. The patient will not be damaged or harmed from the regulator that incorporates the valve of this invention.

As to why the foregoing occurs it is not completely understood, but it is believed that in a single stage regulator, that does not incorporate one of the valves of this invention, the theory of pressurized gas flow called jump occurs, and which probably can be theorized as an indication of the true difference between the gas pressure at the regulator outlet when gas is flowing and its pressure when the gas is not flowing, or when reduced, particularly when this increase in pressure is gauged when the regulator has been shut off, or as the gas pressure reduces. And, the type of increase in pressure shown in FIG. 4 of the drawings apparently occurs due to the pressure on the low pressure side of the regulator rising until the diaphragm is moved far enough to compensate for the reduction in pressure entering into the intake line from the pressure vessel as a result of the depleting gas supply contained therein.

BRIEF DESCRIPTION OF THE DRAWINGS

In the drawings,

FIG. 1 discloses the association between the regulator and its intake and outlet arranged therewith, in addition to the various indicating gauges revealing the high and low pressure gas, while showing the surge reducing valve means of this invention in place;

FIG. 2 provides an enlarge side view of the valve means of this invention as disclosed in FIG. 1;

FIG. 3 furnishes an inlet end view of the valve means of FIG. 2;

DESCRIPTION OF THE PREFERRED EMBODIMENT

Figure 4:
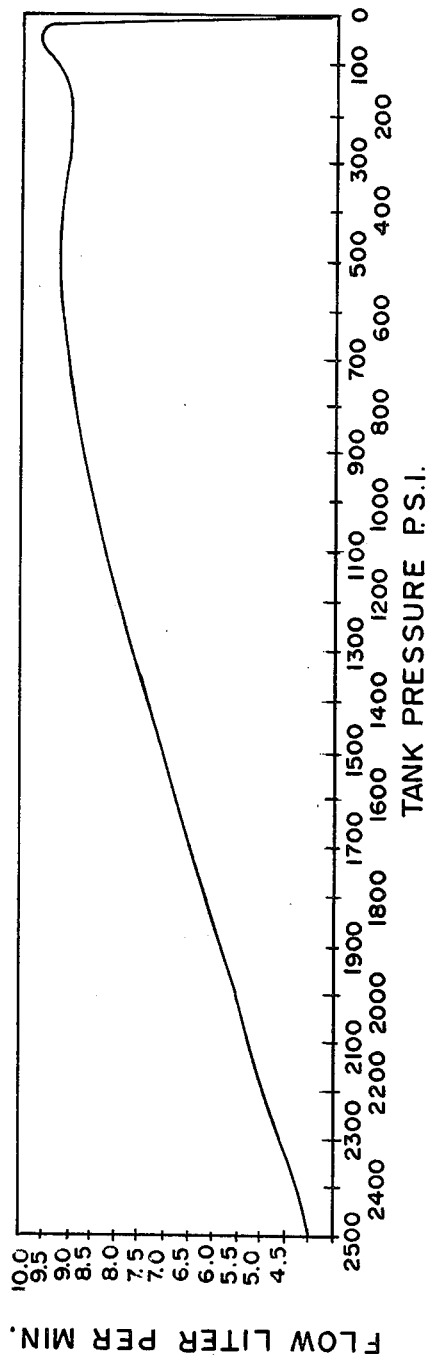
FIG. 4, as previously described, comprises a graph of gas flow until depletion without the valve means of this invention.

In FIG. 1 of the drawings, there is disclosed the regulator of this invention having its handle conveniently disposed for opening or shutting off gas flow through said regulator. The high pressure gauge 2 is provided for furnishing an ever present indication of the amount of pressurized gas yet remaining within the pressure vessel (not shown) from which a quantity of gas is dispensed through this regulator and to the instrument of its usage. In addition, an intake line 3 is associated with the regulator and is disposed for connecting to a conduit that couples with the pressure vessel, while an outlet line 4 attaches with the other side of the regulator, or its low pressure side, for transferring low pressure gas to its source of usage, whether it be an acetylene torch, oxygen mask, or any other instrumentation which requires a low pressure gas in its operation. Furthermore, a low pressure indicator 5 is coupled with the outlet conduit of the regulator, as aforesaid, so as to provide a prompt indication of the amount of low pressure gas passing through the regulator, and which may be set anywhere from zero up to 15 psi depending upon the adjustment made to the regulator handle 1. In addition, within the outlet of the regulator, there may be contained a valve 6 so as to provide for some continuity of the flow of the gas through the regulator, and out of the outlet and to provide means for providing a fine operation of the gauge 5. The nut 7 as shown provides means for connecting this regulator with the conduit leading to the instrument of gas usage, as previously explained.

The essence of this invention is the provision of the surge reducing valve 8 within the regulator, or at least leading towards the entrance into the outlet line for the same, and this valve is positioned in the manner as shown to effect and accomplish the various attributes from this invention as previously summarized and explained in this disclosure.

Figure 5:
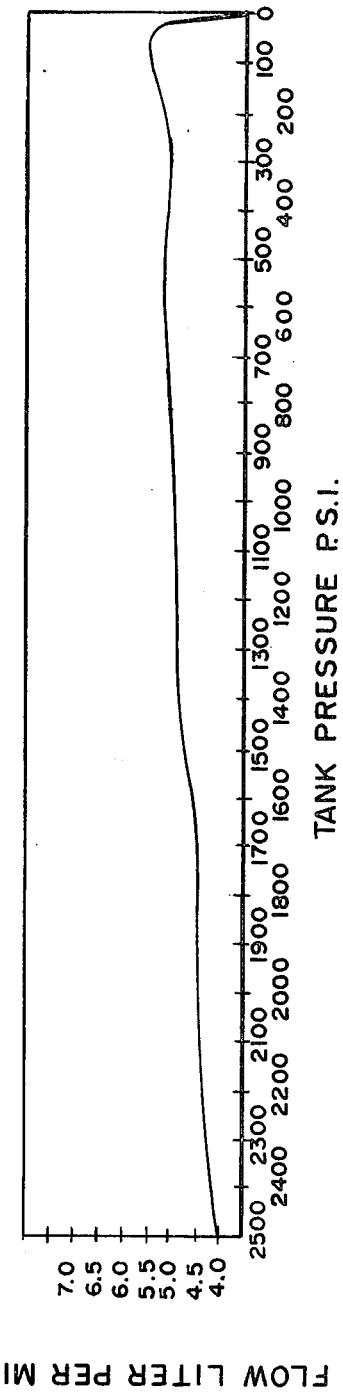
FIG. 5 furnishes a graph disclosing the gas flow through the regulator incorporating the surge reducing valve of this invention.

This valve 8, as can be further seen in greater detail in FIGS. 2 and 3, incorporates a cylindrical portion 9 which is chamfered, as at 10, so as to furnish clearance for the snug seating of the valve within the position as shown in FIG. 1. Furthermore, a shoulder 11 is formed at approximately the midposition of the cylindrical portion of the valve, and this shoulder communicates with a tapered area of the cylindrical portion up to the intake side 12 of the valve. An aperture or channel, as of 13, is provided through the length of the valve, and furnishes a significant reduction in the volumetric capacity for flow of the pressurized gas, as at its lower pressure side from the regulator and through to the outlet of the same, and further furnishes the continuity of the gas flow so as to approximately sustain the gas volume and velocity to that quantity previously set upon adjustment of the regulator handle 1, and which setting has been visually observed by means of the low pressure gauge 5. The desired dimension for the diameter of the aperture 13 provided through the cylindrical portion of the valve is preferably set at less than twenty thousandths of an inch, or more specifically, a diameter of approximately 0.0135 inch has been found to provide the consistency in gas flow at the adjusted level as exhibited through the experimentation that was used to derive the graph of FIG. 5. In addition to the foregoing, the passage through the valve 6 is customarily somewhere set within the range of 0.023 inch, and generally acts as a means for providing some constancy to the gas flow for the benefit of the gauge 5, but when used individually without the valve 8 of this invention has given rise to the inaccuracies in regulator operation as shown upon the graph 4 as constructed from the experimentations made upon such a regulator.

Variations in the construction and fabrication of the regulator incorporating the valve of this invention may occur to those skilled in the art upon reviewing the subject matter of this invention. Such variations, as for example, changing the shape of the portion of the cylindrical body 9 or the valve 8 itself may occur to those skilled in the art upon reviewing the subject matter of this disclosure. Any such variation or modification, if within the spirit of this invention, are intended to be encompassed by the scope of any claims to patent protection issuing hereon. The subject matter of this detailed analysis is set forth for illustrative purposes only, and is not meant to be limiting of the contents of the invention provided herein.

Having thus described the invention what is claimed and desired to be secured by Letters Patent is:

1. In a single stage regulator including means for reducing the flow of gas from a high pressure vessel and including means to substantially reduce any surge in the flow of gas as its high pressure source is shut off, said regulator being of the type having an inlet line for connection with the vessel and an outlet line downstream of said pressure regulator for conveying the low pressure gas to its location of usage, and said single stage regulator means further including a handle for operating with an adjustment spring, diaphragm, and valve means for reducing the high pressure of the vessel down to a more usable level, said surge reducing means including within said outlet line a first restrictor for controlling the outflow of the low pressure gas, the improvement wherein said surge reducing means further comprises a surge reducing second restrictor means located between the said regulator and the outlet line located restrictor for effectively reducing any surge in gas flow during vessel gas discharge and particularly as the regulator is shut off, said surge reducing second restrictor means including a cylindrical portion, said cylindrical portion having a shoulder to accommodate seating of said restrictor means within a portion of said regulator outlet line, and said cylindrical portion having a gas conveying and constricting aperture extending therethrough, and said aperture having a diameter of less than twenty one-thousandths of an inch, whereby during gas flow in that region of the regulator after pressure reduction and gas shut-off said constricting aperture tending to substantially reduce any surge in the flow of gas and to maintain its constant and unturbulent flow from the regulator outlet.

2. The invention of claim 1 and wherein said valve aperture is approximately 0.0135 inch.

3. The invention of claim 1 and wherein said cylindrical portion is tapered from its shoulder to its intake end.

* * * * *